(12) United States Patent
La et al.

(10) Patent No.: US 9,928,187 B2
(45) Date of Patent: Mar. 27, 2018

(54) INCREASING DATA THROUGHPUT IN THE IMAGE PROCESSING PATH OF A DOCUMENT REPRODUCTION DEVICE

(71) Applicant: XEROX CORPORATION, Norwalk, CT (US)

(72) Inventors: Louis B. La, Webster, NY (US); Ryan David Metcalfe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 15/047,117

(22) Filed: Feb. 18, 2016

(65) Prior Publication Data

US 2017/0242810 A1    Aug. 24, 2017

(51) Int. Cl.
| | |
|---|---|
| G06F 13/28 | (2006.01) |
| G06T 1/20 | (2006.01) |
| G06T 1/60 | (2006.01) |
| G06F 3/06 | (2006.01) |

(52) U.S. Cl.
CPC ............ *G06F 13/28* (2013.01); *G06F 3/0613* (2013.01); *G06F 3/0656* (2013.01); *G06F 3/0673* (2013.01); *G06T 1/20* (2013.01); *G06T 1/60* (2013.01)

(58) Field of Classification Search
CPC .... G06F 3/0656; G06F 3/0613; G02B 21/367
See application file for complete search history.

(56) References Cited

U.S. PATENT DOCUMENTS

| | | | | |
|---|---|---|---|---|
| 5,146,325 A | * | 9/1992 | Ng | H04N 19/61 348/384.1 |
| 5,671,389 A | * | 9/1997 | Saliba | G06F 3/0601 710/68 |
| 2008/0111821 A1 | * | 5/2008 | Arora | H04N 5/232 345/520 |
| 2013/0293544 A1 | * | 11/2013 | Schreyer | G06T 15/005 345/426 |

* cited by examiner

*Primary Examiner* — Farley Abad
(74) *Attorney, Agent, or Firm* — Philip E. Blair; Fleit Gibbons Gutman Bongini & Bianco P.L.

(57) ABSTRACT

What is disclosed is a system and method for increasing throughput in the image processing path of a digital document reproduction device. A digital image to be processed is received. Memory is allocated into two buffers, $B_{[0]}$ and $B_{[1]}$. Each buffer has size $$S_B \leq \frac{M}{2},$$

where M is a size of the allocation. The digital image is divided into N number of tiles. Then, for tiles $T_i$, where i=1 to N: (A) the image data of tile $T_i$ is decompressed into buffer $B_{[(i\% 2)=0]}$, and (B) the image data of buffer $B_{[(i\% 2)\neq 0]}$ is decompressed into the image path pipeline. Send a signal indicating that processing of the digital image has completed.

6 Claims, 4 Drawing Sheets

INCREASING DATA THROUGHPUT IN THE IMAGE PROCESSING PATH OF A DOCUMENT REPRODUCTION DEVICE

TECHNICAL FIELD

The present invention is directed to systems and methods for increasing data throughput in a document reproduction device which utilizes Software Image Path (SWIP) processing and which does not have dedicated Electronic Pre-Collation (EPC) memory.

BACKGROUND

Multifunction xerographic products use block based Electronic PreCollation (EPC) memory allocations for scan, mark, and middle function operations (rotation, N-up, etc.). Since some form of data compression is used for most operations that write image data to memory such as, for instance, scanning originals for copying, the amount of memory needed for these operations is not known ahead of time. Therefore, these systems typically use controller interrupts to signal software to dynamically allocate each memory block in real time from a list of free blocks. The real-time overhead for processing these controller interrupts can be undesirable in high performance color reproduction systems. Since many of these systems are developed with single board/single processor architectures, it becomes desirable to maximize system performance and throughput. Moreover, making efficient use of memory is desirable in low cost multifunction document reproduction systems.

Accordingly, what is needed in this art are increasingly sophisticated systems and methods for increasing throughput in a document reproduction device which utilizes Software Image Path (SWIP) processing and which does not have dedicated Electronic Pre-Collation (EPC) memory.

BRIEF SUMMARY

What is disclosed is a system and method for increasing throughput in the image processing path of a digital document reproduction device which utilizes Software Image Path (SWIP) processing and which does not have dedicated Electronic Pre-Collation (EPC) memory. In one embodiment of the present method, a digital image to be processed is received in the image processing path of a document reproduction device. Physical memory is allocated into two buffers, $B_{[0]}$ and $B_{[1]}$. Each buffer has size $$S_B \leq \frac{M}{2},$$

where M is a size of the allocation. The digital image is divided into N number of tiles. For tiles $T_i$, where i=1 to N: (A) decompress the image data of tile $T_i$ into buffer $B_{[(i\% 2)=0]}$, and (B) if image data resides in buffer $B_{[(i\% 2)\neq 0]}$, decompress the image data of buffer $B_{[(i\% 2)\neq 0]}$ into the image path pipeline. Repeat for N number of tiles. Send a signal indicating that processing of the digital image has completed.

Features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
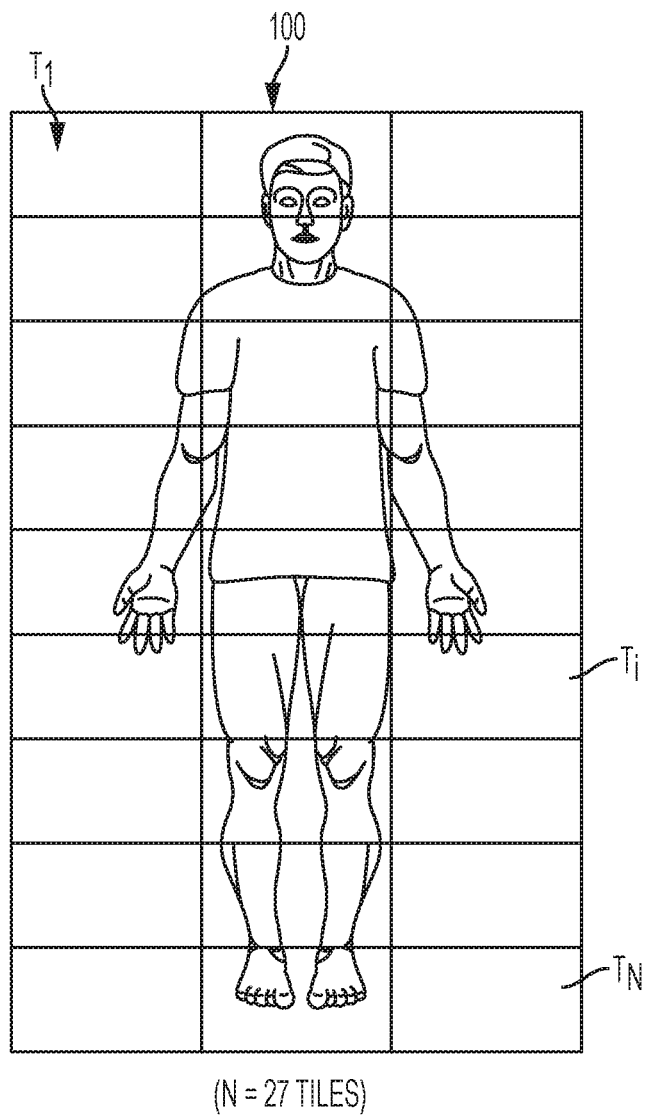
FIG. 1 shows an example image divided into N=27 tiles.

What is disclosed is a system and method for increasing throughput in the image processing path of a digital document reproduction device which utilizes Software Image Path (SWIP) processing and which does not have dedicated Electronic Pre-Collation (EPC) memory.

It should be understood that one of ordinary skill in this art would readily understand various aspects of digital document reproduction and would also be knowledgeable about computer science and hardware and software systems sufficient to implement the functionality described herein in their own document reproduction environments without undue experimentation.

A "digital image" or simply "image" refers to an electronic version of a document to be processed in the image processing path of a document reproduction system in accordance with the methods disclosed herein. The image generally comprises a plurality of pixels. The image is generally stored to memory in a compression format such as, for instance, BMP, JPEG, GIF, TIFF, or any of a wide variety of other formats employed for storing image data. When the image is retrieved from memory, it is decompressed and sent into the image path pipeline of a document reproduction system.

A "document reproduction system" is intended to encompass wide variety of multi-function digital document reproduction systems utilizing Software Image Path (SWIP) processing and which do not utilized dedicated Electronic Pre-Collation (EPC) memory. Such devices generally have a user interface such as touchscreen display for effectuating a human interaction with the device through user-selectable menu options displayed thereon. Additional means may be provided for effectuating a user input such as, for example, a keyboard, keypad, touchpad, mouse, and the like. These systems generally comprise one or more special-purpose device controllers many of which are user-adjustable and/or user-configurable to optimize image quality and device performance. One or more functions, features, or capabilities performed by a computer system or special purpose processor such as an ASIC capable of performing one or more aspects of the present method may be integrated, in whole or in part, with any system or sub-system or device controller of a document reproduction system. In one embodiment, the document reproduction system includes a special purpose processor capable of executing machine executable program instructions for carrying out various aspects of the methods disclosed herein. The processor is in communication with memory to store machine readable instructions for executing various features and embodiments hereof. The memory may include a secondary memory such as, for example, a hard drive or a removable drive such as a floppy disk, magnetic tape, optical disk, etc. The secondary memory may further include other similar mechanisms for allowing computer programs or other instructions to be loaded into the computer system. It should be understood that such devices can be placed in digital communication over a wired or wireless network with one or more computer platforms and/or with other document reproduction devices for the receiving and/or transmitting of a digitized image.

"Direct Memory Access (DMA)" is a feature of many computer systems that allow certain hardware sub-systems access to physical memory independently of the Central Processing Unit (CPU). DMA enables faster synchronization by allowing access to physical memory directly thereby providing significant improvement in throughput and performance. Without DMA, when the CPU is using I/O (input/output), it is typically occupied for the duration of the read/write operation. With DMA, the CPU initiates the transfer then it performs other operations while the transfer is in progress. The CPU receives an interrupt from a DMA controller when the read/write operation is complete. This enables the CPU to perform other tasks while waiting for a relatively slow I/O data transfer to finish. Many hardware systems and sub-systems utilize DMA including disk controllers, graphics cards, network cards, sound cards, and the like. DMA is used for memory-to-memory copying or moving of data within memory from one address to another, and for intra-chip data transfers in multi-core processors. Computers that utilize DMA can transfer data to/from devices with much less overhead than computers without DMA by allowing computation and data transfer to proceed in parallel. DMA can offload expensive memory operations such as large copies from the CPU to a dedicated DMA engine performing scatter/gather transfers for a single render or capture stream. The CPU operates in parallel with a DMA controller to simultaneously address physical memory.

A "DMA controller" can initiate memory read or write operations in parallel with the CPU. The DMA controller comprises a special purpose processor such as an ASIC, or an electronic circuit configured, at least in part, to decompress the image data of a given buffer into an image path pipeline. The DMA controller also contains registers that can be written and read by a CPU such as, for instance, a memory address register, a byte-count register, and control registers containing information which specify the I/O port to use, the direction of the transfer (i.e., reading from an I/O device or writing to an I/O device), the transfer unit (i.e., one byte at a time or one word at a time), and the number of units to transfer in burst mode. To carry out an input, output, or memory-to-memory transfer operation, the processor initializes the DMA controller with a count of the number of data units to transfer, and the memory address to use. The CPU then sends commands to a peripheral device to initiate transfer of data. The DMA controller then provides addresses and read/write control lines to the system memory. Each time a unit or block of data is ready to be transferred, the DMA controller increments an internal address register until all the data is transferred. In burst mode DMA, the CPU can be put on hold while the DMA transfer occurs and a full block of possibly hundreds or thousands of bytes can be moved. When memory cycles are much faster than processor cycles, an interleaved DMA cycle is utilized where the DMA controller uses memory while the CPU cannot. In one embodiment hereof, the DMA controller signals the CPU that decompression of image data into the image path pipeline has completed.

"Physical memory", means memory that is addressable by both a DMA controller and a processor executing machine readable program instructions for processing a digital image in the image processing path of a document reproduction device.

"Allocating physical memory" means dividing the memory into two buffers, $B_{[0]}$ and $B_{[1]}$, each of size $$S \leq \frac{M}{2},$$

where M is a size of the memory allocation. A size of the memory allocation M can be dynamically set as a portion of the physical memory or initialized using a default value set by a user or by the CPU executing machine readable program instructions for analyzing an amount of available physical memory available and deciding how much of that memory should be allocated for use by the present method. The CPU may allocate some or all of the physical memory. In another embodiment, the size of the memory allocation is determined by the DMA controller.

"Dividing a digital image" means to segment the digital image into N tiles of image data, where $T_i$ is the $i^{th}$ tile, where a size of each tile is $S_T$, where $S_T \leq S$. Each tile contains a block of pixels. In one embodiment, $N \geq 4$. FIG. 1 shows an example image 100 divided into N=27 tiles. In one embodiment, N is an even number of tiles. The number of tiles can be based on a file type of a received digital image to be processed, a speed of the memory allocated, and a user input. Preferably, the tiles are equal-sized but don't necessarily have to be.

The "modulo function", denoted syntactically as (a % b), also written mod(x, m) is the functional equivalent of the operator notation given by: x mod m. If m≠0, then mod(x,m) returns the remainder of the operation x/m. For example, (27% 4)=3 because the remainder of 27 divided by 4 is 3. The remainder of (10/2)=0. The modulo is used herein to index buffers $B_{[0]}$ and $B_{[1]}$. When i is an even number, (i % 2)=0 is TRUE=1 and thus buffer $B_{[1]}$ is indexed because the operation has a zero remainder. When i is odd, (i % 2)=0 is FALSE=0 and thus buffer $B_{[0]}$ is indexed because the operation has a non-zero remainder. Conversely, (i%2)≠0 causes buffer $B_{[1]}$ to be indexed when i is even, and buffer $B_{[0]}$ to be indexed when i is odd, by the same reasoning. It should be appreciated that, although the order of compression/decompression herein occurs first with respect to buffer $B_{[(i\% \ 2)=0]}$ and next with respect to buffer $B_{[(i\% \ 2)\neq 0]}$, the ordering can be changed around to occur first into buffer $B_{[(i\% \ 2)\neq 0]}$ and next into buffer $B_{[(i\% \ 2)=0]}$. Such an embodiment can also be effectuated by changing the indexing of the control loop to i=0 to N−1. Such alternatives are intended to fall within the scope of the appended claims.

The "image path pipeline" refers to an Image Output Terminal (IOT) for marking on hardcopy by a marking engine. It also refers to any sub-system which may perform further operations on the decompressed image data.

"Receiving a digital image" is intended to be widely construed and includes: retrieving, capturing, acquiring, or otherwise obtaining a digital image for processing in accordance with the teachings hereof. Digital images can also be retrieved from a memory or storage device of the device used to capture those images, or from a media such as a CDROM or DVD, retrieved from a remote device over a network, or downloaded from a web-based system or application which makes such images available for processing.

It should be appreciated that the steps of "receiving", "allocating", "dividing", "compressing", "decompressing", "signaling", "performing", "setting", "determining", "selecting", and the like, as used herein, include the application of any of a variety of techniques which may utilized mathematical operations according to any specific context or for any specific purpose. It should be appreciated that such steps may be facilitated or otherwise effectuated by a microprocessor executing machine readable program instructions such that an intended functionality can be effectively performed.

Example Flow Diagram

Figure 2:
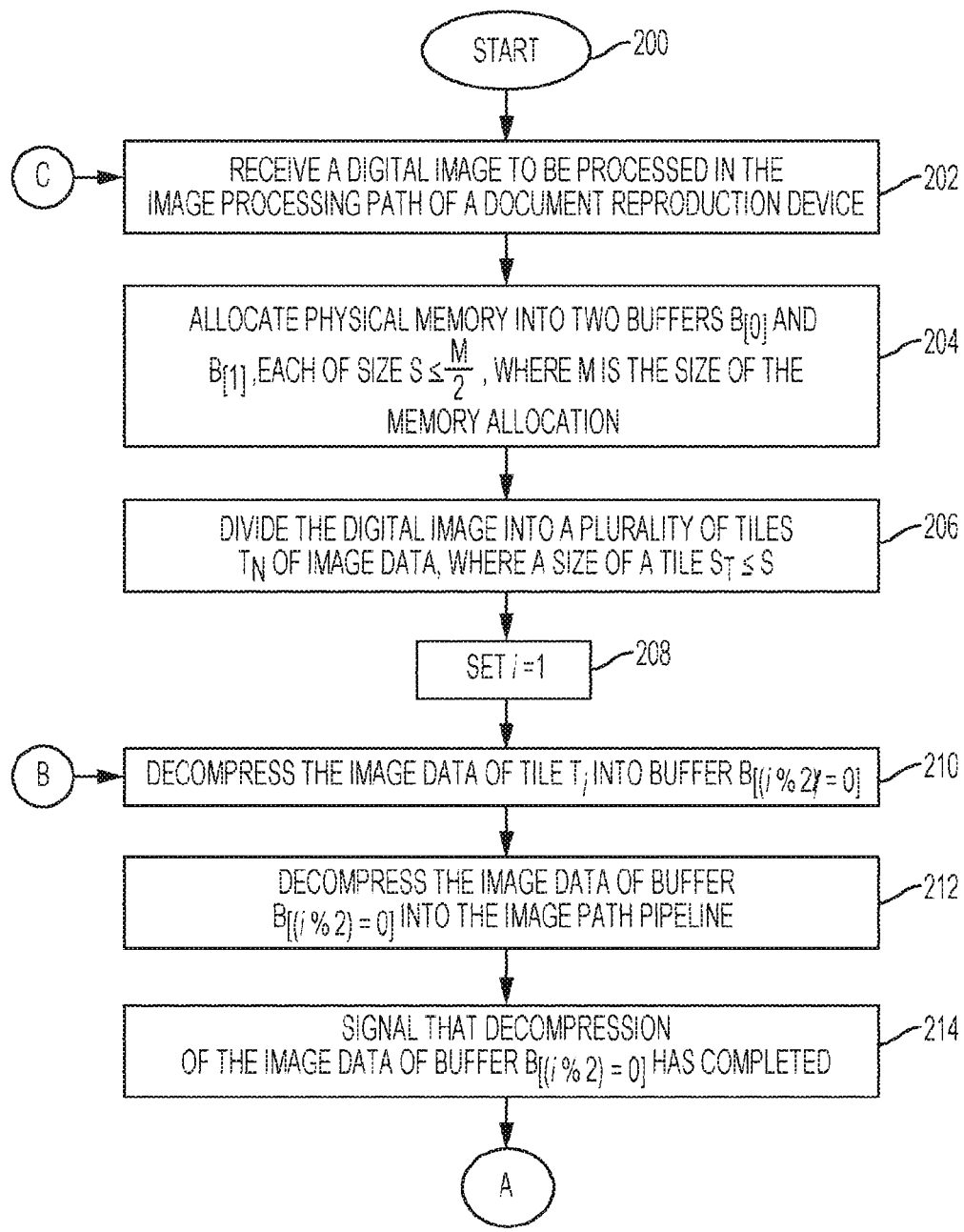
FIG. 2 is a flow diagram which illustrates one example embodiment of the present method for increasing throughput in the image processing path of a digital document reproduction device in accordance with the methods disclosed herein.

Reference is now being made to the flow diagram of FIG. 2 which illustrates one example embodiment of the present method for increasing throughput in the image processing path of a digital document reproduction device in accordance with the methods disclosed herein. Flow processing begins at step 200 and immediately proceeds to step 202.

At step 202, receive a digital image to be processed in an image processing path of a document reproduction device. One example digital image received for processing is shown in FIG. 1.

At step 204, allocate physical memory into two buffers, $B_{[0]}$ and $B_{[1]}$, each of size $$S \leq \frac{M}{2},$$

where M is a size of the memory allocation. The allocated memory is addressable by both a DMA Controller and a Processor.

At step 206, divide the digital image into a plurality of tiles $T_N$ of image data, where a size of each tile $S_T \leq S$. The image of FIG. 1 is shown having been divided in N=27 tiles for processing At step 208, set i=1.

At step 210, decompress the image data of tile $T_i$ into buffer $B_{[(i\%\ 2) \neq 0]}$.

At step 212, decompress the image data of buffer $B_{[(i\%\ 2)=0]}$ into the image path pipeline.

At step 214, signal that decompression of image data of $B_{[(i\%\ 2)=0]}$ has completed.

Figure 3:
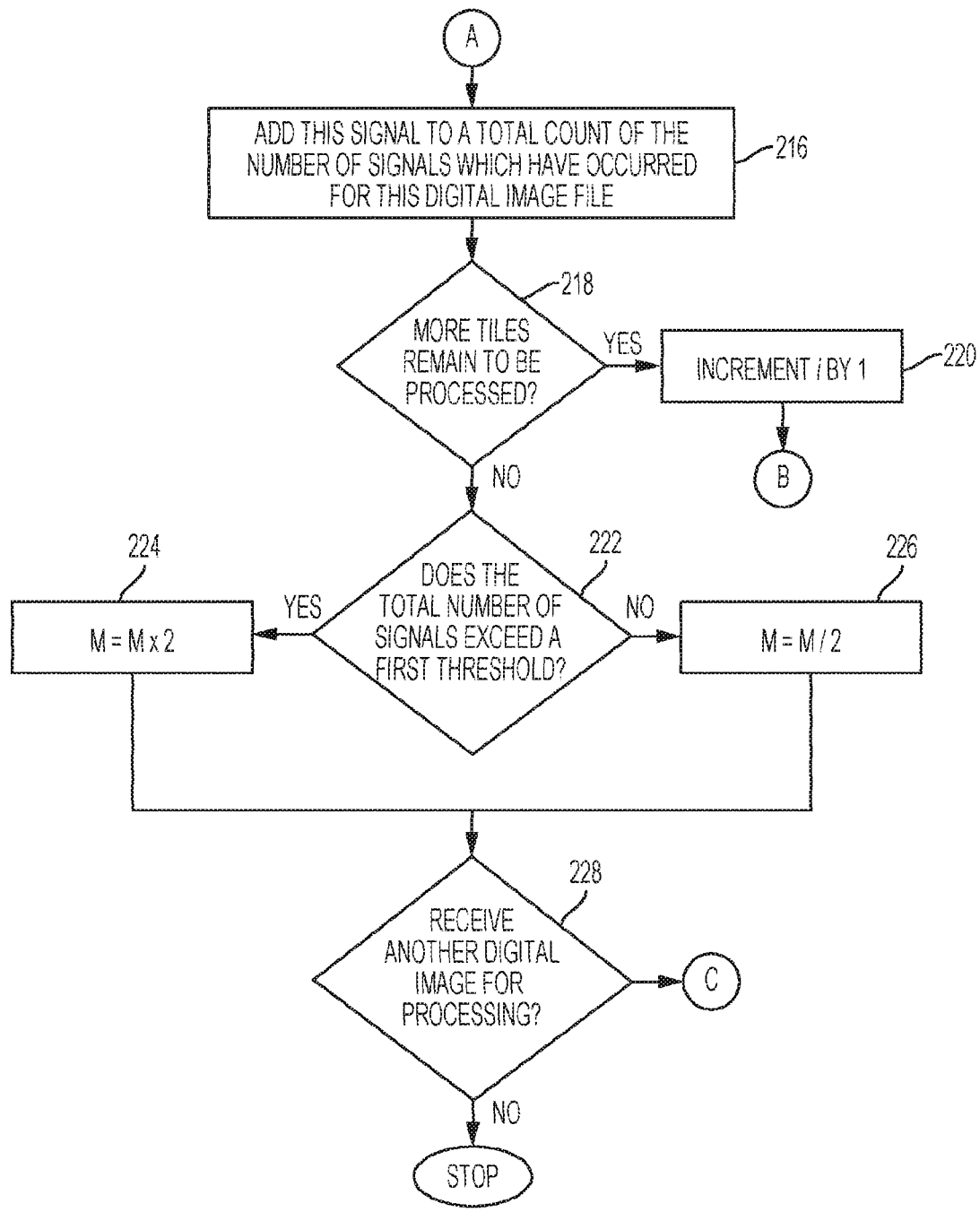
FIG. 3 is a continuation of the flow diagram of FIG. 2 with flow processing continuing with respect to node A.

Reference is now being made to the flow diagram of FIG. 3 which is a continuation of the flow diagram of FIG. 2 with flow processing continuing with respect to node A.

At step 216, add this signal to a total count of the number of signals which have occurred for this digital image file. It should be appreciated that the count of the number of signals for a given digital image is reset back to zero upon the start of processing.

At step 218, a determination is made whether more tiles remain to be processed. Stated differently, does i=N? If not then at step 220, increment the counter i by 1 and continue processing with respect to node B wherein, step 210 wherein the image data of the next tile is decompressed into the appropriate buffer, then proceed to node B wherein a next tile of image data is decompressed into the appropriate buffer. Processing repeats for all tiles until, at step 218, no more tiles remain to be processed.

At step 222, a determination is made whether the total number of signals (counted in step 216) exceeds a first threshold. If so then, at step 224, a size of the memory allocation to be used for a next received digital image is increased by a factor of 2, (i.e., M=M×2). In another embodiment, M=M+1 or is otherwise increased by an amount set by a user. If the total number of signals does not exceed the first threshold then, at step 226, a size of the memory allocation to be used for a next received digital image is decreased by a factor of 2. In this embodiment, M=M/2. In another embodiment, M=M-1 or is otherwise decreased by an amount set by a user.

At step 228, a determination is made whether to process another digital image. If so, then processing repeats with respect to node C wherein, at step 202, a next digital image is received for processing. Processing repeats in a similar manner until no more digital images remain to be processed. If no more digital images remain to be processed in accordance with the teachings hereof, further processing stops.

It should be appreciated that the flow diagrams depicted herein are illustrative. One or more of the operations in the flow diagrams may be performed in a differing order. Other operations may be added, modified, enhanced, or consolidated. Variations thereof are intended to fall within the scope of the appended claims.

Example Functional Block Diagram

Figure 4:
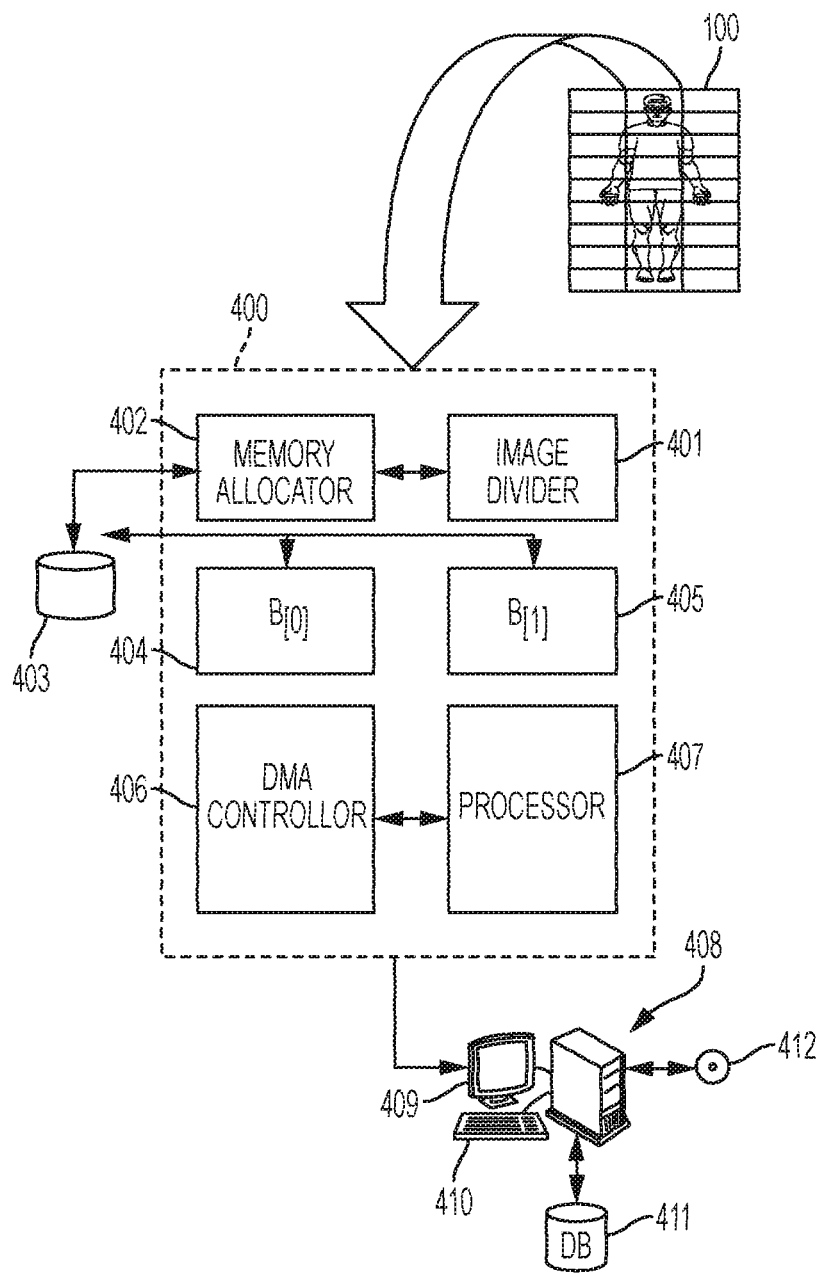
FIG. 4 is a block diagram of one example system for implementing various aspects of the present method described with respect to the flow diagrams of FIGS. 2-3.

Reference is now being made to FIG. 4 which illustrates a block diagram of one example system 400 for implementing various aspects of the present method described with respect to the flow diagrams of FIGS. 2-3.

In FIG. 4, system 400 receives a digital image 100 to be processed in the image processing path of a document reproduction system. Image Divider Module 401 analyzes the digital image and proceeds to divide the digital image 100 into a plurality of tiles $T_N$ of image data, where a size of each tile is $S_T \leq S$. Memory Allocator Module 402 allocates physical memory (shown at 403) into two buffers, $B_{[0]}$ and $B_{[1]}$, (at 404 and 405), each of size $$S \leq \frac{M}{2},$$

where M is a size of the memory allocation. Processor 407 decompresses the image data into buffer 504 or 405 while DMA Controller 406 decompresses the image data of an opposite buffer into the image path pipeline.

Workstation 408 is shown comprising a computer case housing a motherboard, CPU, memory, interface, storage device, and a communications link such as a network card. The computer workstation is also shown having a display device 409 such as a CRT, LCD, or touchscreen display. An alphanumeric keyboard 410 and a mouse (not shown) effectuate a user selection of the various magnification factors. The workstation has an operating system and other specialized software configured to display a variety of numeric values, text, scroll bars, pull-down menus with user selectable options, and the like, for entering, selecting, or modifying information presented on the display device. In the embodiment of FIG. 4, computer system 408 implements a database 411 comprising a plurality of records. Although the database is shown as an external device, the database may be internal to the computer case mounted on a hard disk housed therein. A record refers to any data structure capable of containing information which can be indexed, stored, searched, and retrieved in response to a query. Any of the results of system 400 may also be stored and/or retrieved to any of the records in database 411. Such data and may further be communicated to remote devices over a network (not shown). The workstation further comprises a removable storage media 412.

Any of the modules and processing units of the system of FIG. 4 are in communication with the workstation via pathways (shown and not shown) and may further be in communication with one or more remote devices over a network. It should be appreciated that some or all of the functionality for any of the modules of system 400 may be performed, in whole or in part, by components internal to the workstation or by a special purpose computer system, or by components which are internal to a document reproduction system (not shown).

Various modules may designate one or more components which may, in turn, comprise software and/or hardware designed to perform the intended function. A plurality of modules may collectively perform a single function. Each module may have a specialized processor and memory capable of retrieving and executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, one or more DMA controllers, and other apparatuses some or all of which may be connected via a network. It is also contemplated that one or more aspects of the present method may be practiced in distributed environment where tasks are performed by remote devices that are linked over a network.

The teachings hereof can be implemented in hardware or software using any known or later developed systems, structures, devices, and/or software by those skilled in the applicable art without undue experimentation from the functional description provided herein with a general knowledge of the relevant arts.

One or more aspects of the system and methods described herein are intended to be incorporated in an article of manufacture which may be shipped, sold, leased, or otherwise provided separately either alone or as part of a product suite or a service.

It will be appreciated that the above-disclosed and other features and functions, or alternatives thereof, may be desirably combined into other different systems or applications. Presently unforeseen or unanticipated alternatives, modifications, variations, or improvements may become apparent and/or subsequently made by those skilled in this art which are also intended to be encompassed by the following claims.

What is claimed is:

1. A method for increasing throughput in the image processing path of a digital document reproduction device which utilizes Software Image Path (SWIP) processing and which does not have dedicated Electronic Pre-Collation (EPC) memory, comprising:
   receiving a digital image to be processed in an image processing path of a document reproduction device;
   allocating physical memory addressable by a processor and a DMA controller into two buffers, $B_{[0]}$ and $B_{[1]}$, each of size $$S \leq \frac{M}{2},$$

where M is a size of the memory allocation;
   dividing the digital image into a plurality of tiles $T_N$ of image data, where $T_i$ is the $i^{th}$ tile, where a size of each tile is $S_T$, where $S_T \leq S$; and
   for all tiles $T_i$, where i=1 to N:
      (A) decompressing image data of tile $T_i$ into buffer $B_{[(i\% 2)=0]}$; and
      (B) in response to image data residing in buffer $B_{[(i\% 2)\neq 0]}$, decompressing the image data of buffer $B_{[(i\% 2)\neq 0]}$ into an image path pipeline, an occurrence of steps (A) and (B) substantially overlapping.

2. The method of claim 1, wherein the number of tiles is based on any of: a file type of a digital image to be processed, a speed of the memory allocated, and a user input.

3. The method of claim 1, wherein the image path pipeline is any of: an Image Output Terminal (IOT) for marking on hardcopy, and an image processing sub-system.

4. A system for increasing throughput in the image processing path of a digital document reproduction device which utilizes Software Image Path (SWIP) processing and which does not have dedicated Electronic Pre-Collation (EPC) memory, the system comprising:
   a Direct Memory Access (DMA) controller;
   physical memory addressable by the DMA controller; and
   a processor in communication with the DMA controller and the physical memory, the processor executing machine readable program instructions for performing:
      receiving a digital image to be processed;
      allocating the physical memory into two buffers, $B_{[0]}$ and $B_{[1]}$, each of size $$S \leq \frac{M}{2},$$

where M is a size of the memory allocation;
      dividing the digital image into a plurality of tiles $T_N$ of image data, where $T_i$ is the $i^{th}$ tile, where a size of each tile is $S_T$, where $S_T \leq S$; and
      for all tiles $T_i$, where i=1 to N:
         (A) decompressing image data of tile $T_i$ into buffer $B_{[(i\% 2)=0]}$; and
         (B) in response to image data residing in buffer $B_{[(i\% 2)\neq 0]}$, signaling the DMA controller to decompress the image data of buffer $B_{[(i\% 2)\neq 0]}$, an occurrence of (A) and (B) substantially overlapping.

5. The system of claim 4, wherein the number of tiles is based on any of: a file type of a digital image to be processed, a speed of the memory allocated, and a user input.

6. The system of claim 4, wherein the image path pipeline is any of: an Image Output Terminal (IOT) for marking on hardcopy, and an image processing sub-system.

* * * * *